(12) United States Patent
Wang

(10) Patent No.: US 11,306,770 B2
(45) Date of Patent: Apr. 19, 2022

(54) ROLLER ASSEMBLY

(71) Applicant: FIVETECH TECHNOLOGY INC., New Taipei (TW)

(72) Inventor: Ting-Jui Wang, New Taipei (TW)

(73) Assignee: FIVETECH TECHNOLOGY INC., New Taipei (TW)

( * ) Notice: Subject to any disclaimer, the term of this patent is extended or adjusted under 35 U.S.C. 154(b) by 0 days.

(21) Appl. No.: 16/531,239

(22) Filed: Aug. 5, 2019

(65) Prior Publication Data
US 2019/0353202 A1 Nov. 21, 2019

Related U.S. Application Data

(63) Continuation-in-part of application No. 14/940,222, filed on Nov. 13, 2015, now Pat. No. 10,458,464.

(30) Foreign Application Priority Data

Nov. 17, 2014 (TW) .................. 103139832

(51) Int. Cl.
| | | |
|---|---|---|
| *F16C 13/00* | (2006.01) | |
| *F16C 33/66* | (2006.01) | |
| *F16C 13/02* | (2006.01) | |
| *B23P 15/00* | (2006.01) | |

(52) U.S. Cl.
CPC ........ *F16C 13/006* (2013.01); *F16C 33/6637* (2013.01); *F16C 33/6696* (2013.01); *B23P 15/003* (2013.01); *F16C 13/022* (2013.01)

(58) Field of Classification Search
CPC .................................................... F16C 13/006
See application file for complete search history.

(56) References Cited

U.S. PATENT DOCUMENTS

| | | | |
|---|---|---|---|
| 4,102,009 A | | 7/1978 | Kelly |
| 4,834,557 A | * | 5/1989 | Dreinhoff ........... B60B 33/0028 384/54 |
| 5,070,575 A | | 12/1991 | Redman |
| (Continued) | | | |

FOREIGN PATENT DOCUMENTS

| | | | | |
|---|---|---|---|---|
| CN | 204378493 U | | 6/2015 | |
| EP | 1700540 A1 | * | 9/2006 | ............. A47B 88/40 |
| TW | 408691 U | | 10/2000 | |

OTHER PUBLICATIONS

Restriction Requirement dated Jan. 29, 2018 for U.S. Appl. No. 14/940,222.

(Continued)

*Primary Examiner* — Sarang Afzali
(74) *Attorney, Agent, or Firm* — Schmeiser, Olsen & Watts, LLP

(57) ABSTRACT

A roller assembly includes a roller having an axial hole and an axle portion disposed in the axial hole to allow the roller to rotate about the axle portion; a sleeve with a first end disposed at a first end of the axle portion and a second end having a fitting portion, the fitting portion being fitted to a carried object, the sleeve has a first blocking portion positioned proximate to a first side of the roller to allow the roller to rotate between the first blocking portion and the fitting portion, wherein one of the axle portion, the axial hole and the first blocking portion has a substance conducive to reduction of friction between the roller and the sleeve.

7 Claims, 13 Drawing Sheets

(56) References Cited

U.S. PATENT DOCUMENTS

| | | |
|---|---|---|
| 7,021,007 B2 | 4/2006 | Jacobs |
| 7,654,608 B2 | 2/2010 | Krajenke |
| 7,849,560 B2 | 12/2010 | Kelley |
| 8,308,221 B2 | 11/2012 | Kitayama |
| 8,690,434 B2 | 4/2014 | Desrosiers |
| 8,881,480 B1 | 11/2014 | Bouthillier |
| 9,841,044 B2 | 12/2017 | Wang |
| 2004/0256333 A1 | 12/2004 | Buhlmeyer |
| 2014/0265801 A1* | 9/2014 | Klitzing ............... A47B 88/437 312/404 |

OTHER PUBLICATIONS

Non-Final Office Action dated May 15, 2018 for U.S. Appl. No. 14/940,222.
Final Office Action dated Dec. 3, 2018 for U.S. Appl. No. 14/940,222.
Advisory Office Action dated Mar. 7, 2019 for U.S. Appl. No. 14/940,222.
Non-Final Office Action dated Mar. 19, 2019 for U.S. Appl. No. 14/940,222.

\* cited by examiner

ROLLER ASSEMBLY

CROSS-REFERENCE TO RELATED APPLICATION

This application is a continuation-in-part patent application of U.S. application Ser. No. 14/940,222 filed on Nov. 13, 2015, now U.S. Pat. No. 10,458,464, the entire contents of which are hereby incorporated by reference for which priority is claimed under 35 U.S.C. § 120.

BACKGROUND OF THE INVENTION

1. Field of the Invention

The present disclosure relates to roller structures and methods of manufacturing the same, and in particular to a roller structure conducive to reduction of friction a roller rolling and thereby enhancement of the ease of the rolling of the roller with a view to enhancing ease of use, and a method of manufacturing the roller structure.

2. Description of the Related Art

It is well known that rollers are mounted on a movable object, such as a sliding door of an apparatus or cabinet, a drawer, or a movable board, to reduce the friction between the movable object and a rail or any other object. Given the rolling contact between each rolling roller and the track or any other object, the friction therebetween decreases so as to render movement smooth.

However, conventional roller assembly structures and methods of manufacturing the same still have room for improvement. For instance, when rolling, conventional rollers have to bear the weight of a moving object, and thus the friction between the roller surface and an external rolling contact surface, or between the inner rim of the roller and the contact surface of its axle portion, is excessively great to the detriment of the rolling.

Therefore, it is important to provide a roller structure and a method of manufacturing the same to effectively reduce the rolling friction of the roller, and thus the roller rolls easily, thereby enhancing ease of use.

BRIEF SUMMARY OF THE INVENTION

In view of the aforesaid drawbacks of the prior art, it is an objective of the present disclosure to provide a roller structure and a method of manufacturing the same to effectively reduce the rolling friction of the roller, and thus the roller rolls easily, thereby enhancing ease of use.

To achieve at least the above objective, the present disclosure provides a roller structure, comprising a roller having an axial hole and an axle portion disposed in the axial hole to allow the roller to rotate about the axle portion; a sleeve with an end disposed at an end of the axle portion and another end having a fitting portion, the fitting portion being fitted to a carried object, the sleeve has a first blocking portion positioned proximate to a side of the roller to allow the roller to rotate between the first blocking portion and the fitting portion, wherein one of the axle portion, the axial hole and the first blocking portion has a substance conducive to reduction of friction between the roller and the sleeve.

Regarding the roller structure, friction between the roller rolling and the sleeve is less than friction between a roller surface contact object and the roller rolling on the roller surface contact object, allowing the roller to roll on the roller surface contact object and the axle portion under an applied force.

Regarding the roller structure, the substance conducive to reduction of friction is liquid, solid, powder or aerosol.

Regarding the roller structure, the substance conducive to reduction of friction is Teflon, oil, plastic, lubricant, pad or washer.

Regarding the roller structure, friction between the roller and the sleeve is less than friction between a roller surface contact object and the roller rolling on the roller surface contact object while the roller is rolling and bearing the weight of the carried object.

Regarding the roller structure, the substance conducive to reduction of friction is coated or mounted on one of the axle portion, the axial hole and the first blocking portion by spraying, soaking, adhesion, engagement, electroplating, smearing, adsorption or fastening.

The roller structure further comprises a second blocking portion disposed at another end of the axle portion and positioned proximate to another side of the roller to allow the roller to rotate between the first blocking portion and the second blocking portion, the second blocking portion having a substance conducive to reduction of friction between the roller and the sleeve.

Regarding the roller structure, substance conducive to reduction of friction is coated or mounted on the second blocking portion by spraying, soaking, adhesion, engagement, electroplating, smearing, adsorption or fastening.

The present disclosure further provides a method of manufacturing a roller structure, wherein a substance conducive to reduction of friction is coated or mounted on the axle portion, the axial hole, the first blocking portion or the second blocking portion to reduce friction between the roller and the sleeve.

Therefore, the roller structure and the method of manufacturing the same according to the present disclosure effectively reduce the rolling friction of the roller, and thus the roller rolls easily, thereby enhancing ease of use.

DETAILED DESCRIPTION OF THE INVENTION

To facilitate understanding of the object, characteristics and effects of this present disclosure, embodiments together with the attached drawings for the detailed description of the present disclosure are provided.

Figure 1:
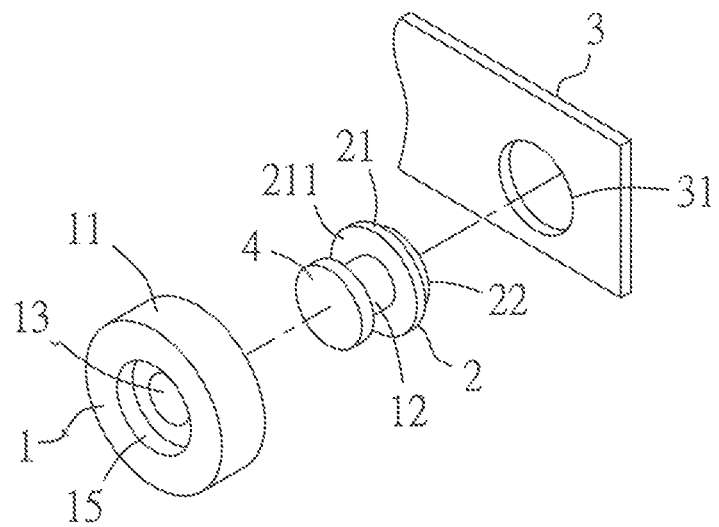
FIG. 1 is an exploded view of a roller structure according to the first preferred embodiment of the present invention.
Figure 2:
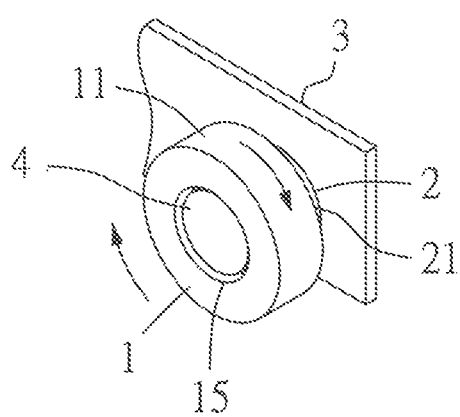
FIG. 2 is a perspective view of the roller structure according to the first preferred embodiment of the present invention.
Figure 3:
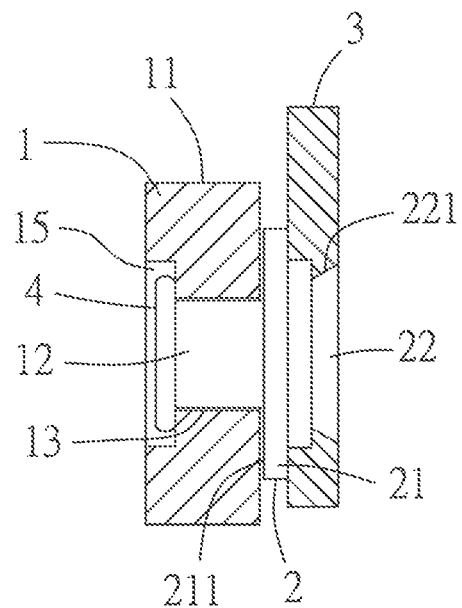
FIG. 3 is a cross-sectional view 1 of the roller structure according to the first preferred embodiment of the present invention.
Figure 4:
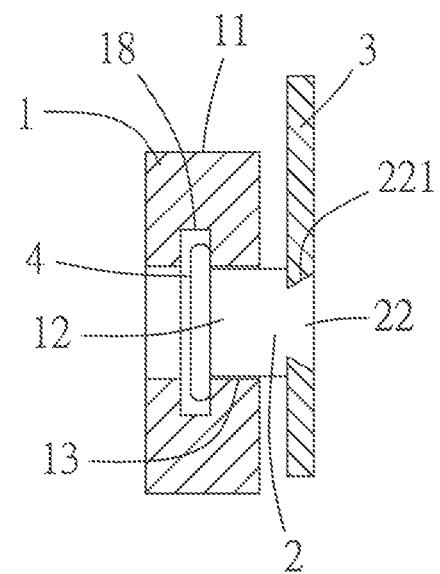
FIG. 4 is a cross-sectional view 2 of the roller structure according to the first preferred embodiment of the present invention.

Referring to FIG. 1 through FIG. 3, the present invention provides a roller structure and a manufacturing method thereof, applicable to rollers. In a preferred embodiment of the present invention, the roller structure comprises a roller 1 and a second stop portion 4. The roller 1 is adapted to carry a load 3 and made of a single-ingredient material, such as a metal, a plastic or a rubber, or a multiple-ingredient material. The roller 1 is a cylinder circumferentially provided with a rolling surface 11 for contact with any other object regardless of whether the roller 1 is rotating or not. The rolling surface 11 is either glossy or striped. When striped, the rolling surface 11 exhibits stripes which run longitudinally, transversely, obliquely or cross each other. The roller 1 is centrally provided with an axial portion 12 for driving the roller 1 to rotate. Preferably, the axial portion 12 is disposed in an axial hole 13 disposed centrally at the roller 1 such that the roller 1 rotates about the axial portion 12. The roller 1 is coupled to a load 3 through the axial portion 12 and a bush 2. Preferably, the bush 2 is a cylinder made of a single-ingredient material, such as a metal or a plastic, or a multiple-ingredient material. One end of the bush 2 is formed integrally with or coupled to ne end of the axial portion 12 and enclosed with a first stop portion 21 adjacent to the roller 1. The first stop portion 21 has a first stop surface 211 corresponding in position to a side of the roller 1. Another end of the bush 2 has an engaging portion 22. The bush 2 is coupled to the load 3 through the engaging portion 22. The first stop portion 21 separates the roller 1 and the load 3 to thereby prevent the roller 1 from coming into contact with the load 3; hence, the roller 1 is rotatably disposed at the load 3. The second stop portion 4 serves to limit disconnection-proof components or structures disposed in the axial direction of the roller 1 and, in a preferred embodiment, is formed integrally with or coupled to another end (facing away from the bush 2) of the axial portion 12 and positioned proximate to another side (facing away from the bush 2) of the roller 1; hence, the roller 1 rotates between the first stop portion 21 and the second stop portion 4 to therefore effectuate the roller structure of the present invention. In addition, referring to FIG. 4, in a variant embodiment of the present invention, the roller structure is dispensed with the first stop portion 21. Referring to FIG. 4, an inner annular groove 18 is disposed on another side of the roller 1 to fix movably around the circumferential edge of the second stop portion 4.

Figure 6:
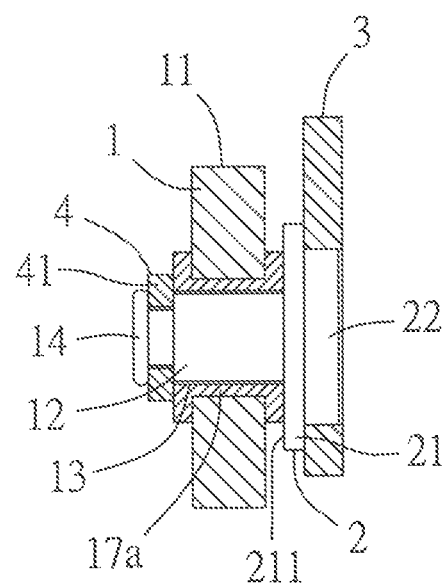
FIG. 6 is a cross-sectional view of the roller structure according to the third preferred embodiment of the present invention.
Figure 7:
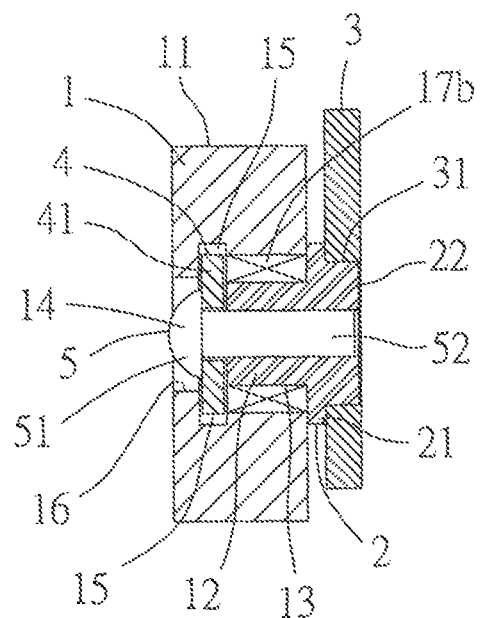
FIG. 7 is a cross-sectional view of the roller structure according to the third preferred embodiment of the present invention.
Figure 8:
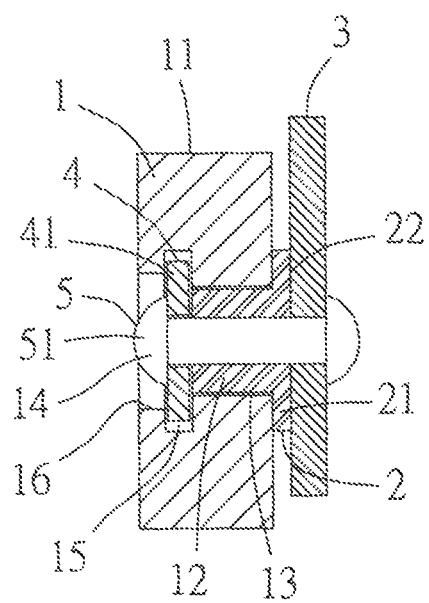
FIG. 8 is a cross-sectional view of the roller structure according to the third preferred embodiment of the present invention.

Referring to FIG. 3, FIG. 4, FIG. 5 and FIG. 9, in an embodiment of the present invention, the second stop portion 4 is preferably formed at another end of the axial portion 12 by injection molding in a manner that the second stop portion 4 has a larger diameter than the axial portion 12 so as to limit the movement of the roller 1 from another side thereof. Referring to FIG. 6, FIG. 7 or FIG. 8, in another embodiment of the present invention, the second stop portion 4 is provided with a stop component 41 which has a larger diameter than the axial portion 12 and functions as a hollow-core component, ring, C-ring, clip, bush or bearing for use in penetrable coupling or snug engagement such that the stop component 41 is fitted around the axial portion 12. Preferably, the axial portion 12 has a third stop portion 14 for limiting the movement of the stop component 41. In an embodiment of the present invention, the third stop portion 14 is formed by performing a pressing process on another end of the axial portion 12 (as shown in FIG. 6) such that the stop component 41 is coupled to the axial portion 12 firmly. In a variant embodiment of the present invention, the third stop portion 14 is provided in the form of a head portion 51 of a connection component 5 such that a body portion 52 of the connection component 5 is coupled to the axial portion 12 and the bush 2 (shown in FIG. 7 and FIG. 8); hence, the movement of the stop component 41 is limited by the third stop portion 14 formed from the head portion 51 of the connection component 5, thereby allowing the stop component 41 to be coupled to the axial portion 12 firmly.

Figure 5:
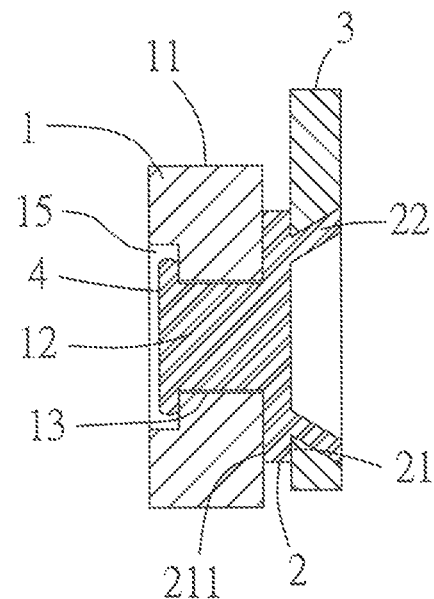
FIG. 5 is a cross-sectional view of the roller structure according to the second preferred embodiment of the present invention.

Referring to FIG. 3 and FIG. 5, a receiving chamber 15 concentric with the axial portion 12 is disposed on one or two sides of the roller 1 and is round, polygonal or of any appropriate geometric shape such that the first stop portion 21, the second stop portion 4 or the third stop portion 14 is received in the receiving chamber 15 of the roller 1 to thereby prevent the first stop portion 21, the second stop portion 4 or the third stop portion 14 from protruding from the roller 1 laterally. Referring to FIG. 7 and FIG. 8, a limiting portion 16 is disposed on another side of the roller 1 and provided in the form of a neck portion disposed on the inner wall of the receiving chamber 15 to not only confine the second stop portion 4 to between the limiting portion 16 and the roller 1 but also prevent the roller 1 from loosening.

Figure 9:
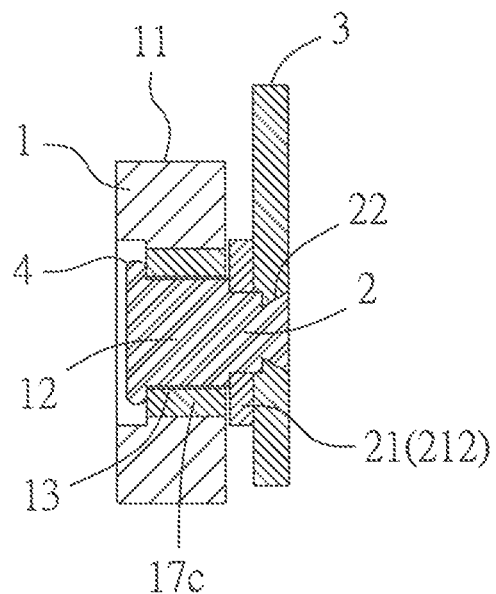
FIG. 9 is a cross-sectional view of the roller structure according to the third preferred embodiment of the present invention.

Referring to FIG. 6, preferably, in an embodiment of the present invention, the roller 1 is provided with an inner ring 17a which fits around the axial portion 12. The inner diameter of the inner ring 17a defines the axial hole 13. The contact between the inner ring 17a and the axial portion 12 enhances the mechanical strength of the roller 1 and reduces the wear and tear of the axial hole 13. For example, when the roller 1 is made of a plastic or a rubber, the inner ring 17a is made of a metal of high rigidity. Referring to FIG. 7, the roller 1 is preferably provided with a rolling component 17b for fitting around the axial portion 12 and exemplified by a ball bearing, a needle bearing or an equivalent component, wherein the inner diameter of the rolling component 17b defines the axial hole 13. The rolling component 17b not only functions as well as the inner ring 17a but is also effective in reducing the coefficient of friction between the roller 1 and the axial portion 12 to thereby enable the roller 1 to rotate smoothly. Referring to FIG. 9, the roller 1 is preferably provided with a sliding component 17c for fitting around the axial portion 12 and exemplified by a bush capable of self-lubrication and thus capable of bearing a heavy load and being more durable.

As indicated above, according to the present invention, the engaging portion 22 of the bush 2 enables the roller 1 to be mounted on the load 3, and the engaging portion 22 is coupled to the load 3 by a riveting mechanism (shown in FIG. 3), an expansion mechanism (shown in FIG. 5), a welding mechanism (shown in FIG. 6), an engaging mechanism, a fastening mechanism or a magnetic attraction mechanism, or by any other means of fixation. Referring to FIG. 8, the engaging portion 22 of the bush 2 is not directly coupled to the load 3 but is positioned proximate to the load 3 from one side thereof and then coupled to the bush 2 and the load 3 through a connection component 5. Referring to FIG. 9, the present invention is not limited to an embodiment where the first stop portion 21 of the bush 2 is formed integrally with the bush 2; instead, in a variant embodiment, it is also practicable that the first stop portion 21 is provided with a stop component 212 which functions as a hollow-core component, ring, C-ring, clip, bush or bearing for use in penetrable coupling or snug engagement. Likewise, one side of the stop component 212 has a first stop surface 211 corresponding in position to one side of the roller 1 so as to come into smooth contact with the roller 1.

Figure 14:
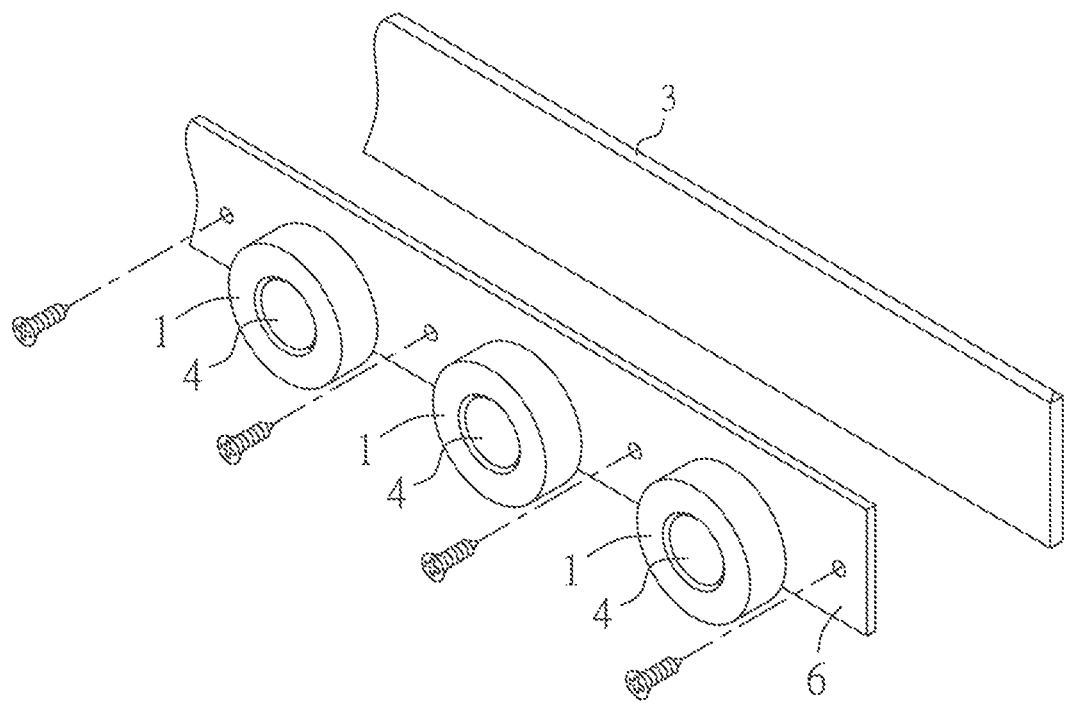
FIG. 14 is an exploded view of a modularized frame according to a preferred embodiment of the present invention.

In addition, the present invention puts no limit on the technical feature that the roller 1 is directly coupled to the load 3 through the bush 2. Referring to FIG. 14, in a variant embodiment, a frame 6 is provided. The engaging portion 22 of the bush 2 is coupled to the frame 6 in advance, and then the engaging portion 22 of the bush 2 is coupled to the load 3 through the frame 6; hence, one or more roller structures of the present invention function as module with standard specification so as to couple the rollers and the load 3 quickly. In a preferred embodiment, the frame 6 is slender, plate-shaped or of any other geometric shapes as needed, and is coupled to the load 3 by the load 3 by a riveting mechanism, an expansion mechanism, a welding mechanism, an engaging mechanism, a fastening mechanism, a magnetic attraction mechanism, or any equivalent mechanism.

As regards the sequence of the assembly of the roller structures of the present invention, it is feasible that the roller 1 and the axial portion 12 are coupled to the bush 2 and the second stop portion 4 in advance to form a module, and then the engaging portion 22 of the bush 2 is coupled to the load 3 or the frame 6 by one of the aforesaid mechanisms. In a variant embodiment, it is practicable for the roller 1 and the axial portion 12 to be coupled to the second stop portion 4 in advance to form module, and then for the bush 2 to be coupled to the load 3 to form a module, and eventually for the axial portion 12 to be coupled to the bush 2, the two modules are coupled together. However, the aforesaid sequence is subject to changes as needed. In addition, the present invention is characterized in that the engaging portion 22 of the bush 2 is coupled to the load 3 or frame 6 by a riveting mechanism, an expansion mechanism, a welding mechanism, an engaging mechanism, a fastening mechanism or a magnetic attraction mechanism. The engaging portion 22 of the bush 2 has a feeding space 221. After the feeding space 221 has been aligned with an installation hole 31 of the load 3, the material which the load 3 is to be made of is injected into the feeding space 221 of the engaging portion 22 as soon as a die 10 presses against the roller 1 or the second stop portion 4 (shown in FIG. 11) or another die 20 presses against the load 3 (shown in FIG. 11) or the engaging portion 22 (shown in FIG. 13), thereby allowing the engaging portion 22 to be coupled to the load 3 to therefore effectuate quick assembly and enhance the efficiency of assembly.

Figure 10:
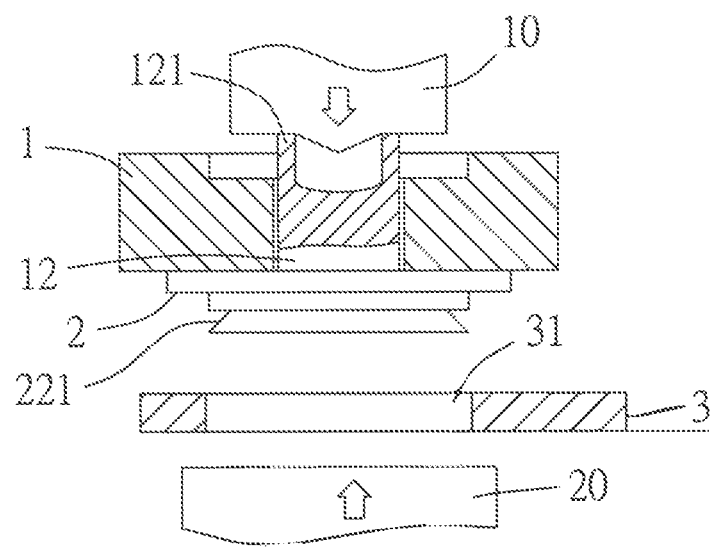
FIG. 10 is a schematic view of a manufacturing method of the roller structure according to the first preferred embodiment of the present invention.
Figure 11:
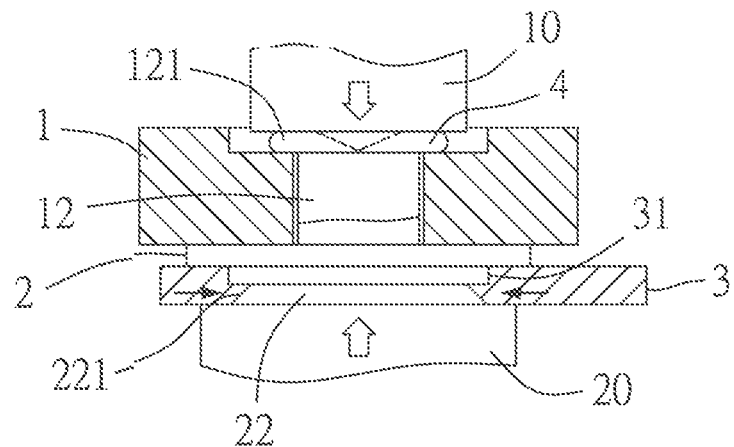
FIG. 11 is a schematic view of the manufacturing method according to the first preferred embodiment of the present invention.
Figure 12:
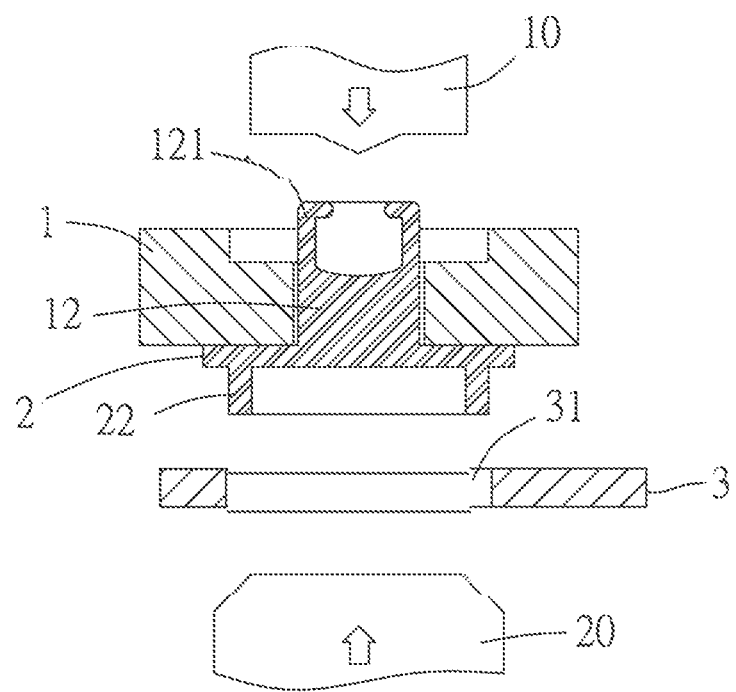
FIG. 12 is a schematic view of the manufacturing method according to the second preferred embodiment of the present invention.
Figure 13:
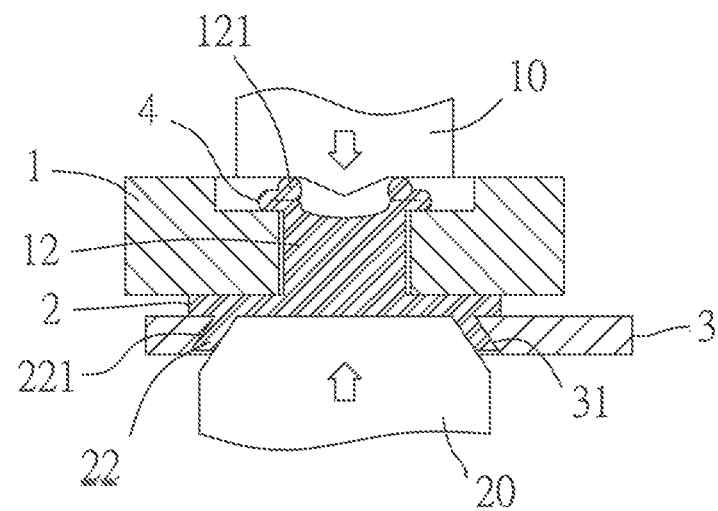
FIG. 13 is a schematic view of the manufacturing method according to the second preferred embodiment of the present invention.

The present invention further provides a manufacturing method for use with the aforesaid roller structure. The manufacturing method is characterized in that a pressed portion 121 (shown in FIG. 10 and FIG. 12) is disposed at one end of the axial portion 12 by being formed integrally therewith, and the pressed portion 121 is cylindrical or of any equivalent shape. Referring to FIG. 11 and FIG. 13, and the second stop portion 4 positioned proximate to the roller 1 is formed by performing a pressing process on the pressed portion 121 via a die 10. The advantages of the manufacturing method are as follows: the second stop portion 4 is formed quickly; and an assembly process of the roller 1 is quickly carried out especially when the roller structure of the present invention functions as a standardized module.

As regards the manufacturing method for use with the aforesaid roller structure according to the present invention, the engaging portion 22 of the bush 2 is coupled to the load 3 or the frame 6 by a riveting mechanism, an expansion mechanism, a welding mechanism, an engaging mechanism, a fastening mechanism or a magnetic attraction mechanism. The engaging portion 22 of the bush 2 has a feeding space 221; hence, after the feeding space 221 has been aligned with the installation hole 31 of the load 3, the material which the load 3 is to be made of is injected into the feeding space 221 of the engaging portion 22 as soon as a die 10 presses against the roller 1 or the second stop portion 4 (shown in FIG. 11) or another die 20 presses against the load 3 (shown in FIG. 11) or the engaging portion 22 (shown in FIG. 13), thereby allowing the engaging portion 22 to be coupled to the load 3 to therefore effectuate quick assembly and enhance the efficiency of assembly.

Figure 15:
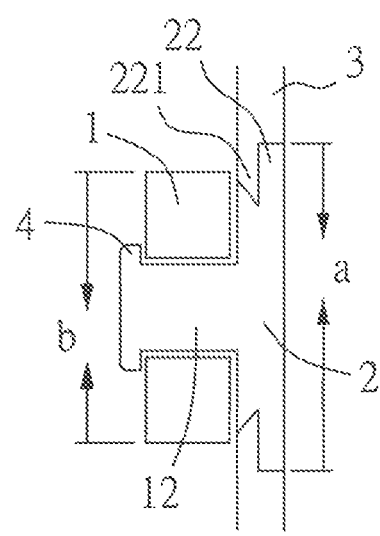
FIG. 15 is a cross-sectional view of the roller structure according to the preferred embodiment of the present invention.
Figure 16:
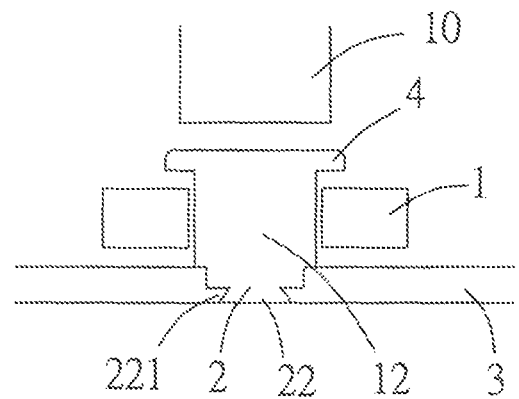
FIG. 16 is a schematic view 1 of the manufacturing method according to the preferred embodiment of the present invention.
Figure 17:
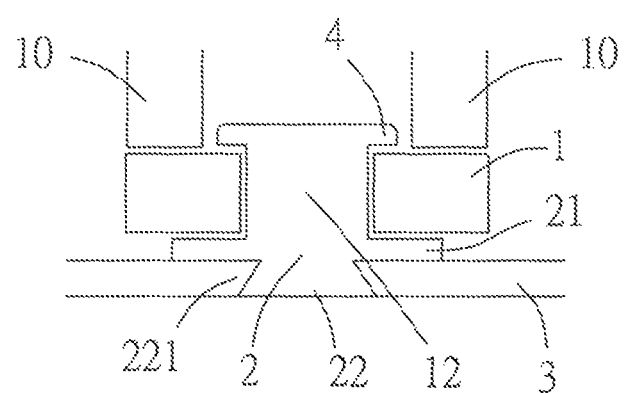
FIG. 17 is a schematic view 2 of the manufacturing method according to the preferred embodiment of the present invention.

Referring to FIG. 3 and FIG. 15, a diameter a of the engaging portion 22 of the bush 2 is larger (shown in FIG. 15) or smaller (shown in FIG. 3) than a diameter b of the roller 1. In addition, the feeding space 221 of the engaging portion 22 of the bush 2 faces the roller 1 (shown in FIG. 15) or faces away from the roller 1 (shown in FIG. 3).

Figure 18:
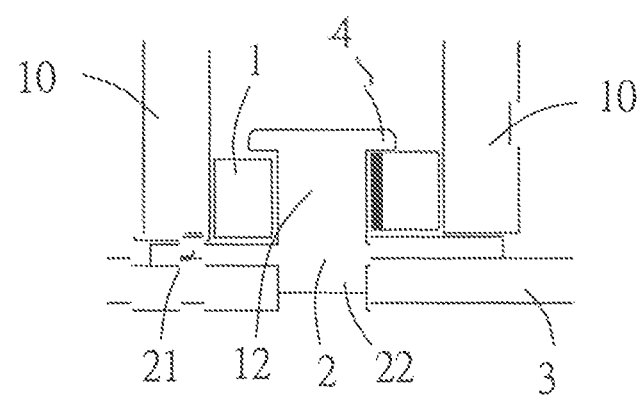
FIG. 18 is a schematic view 3 of the manufacturing method according to the preferred embodiment of the present invention.
Figure 19:
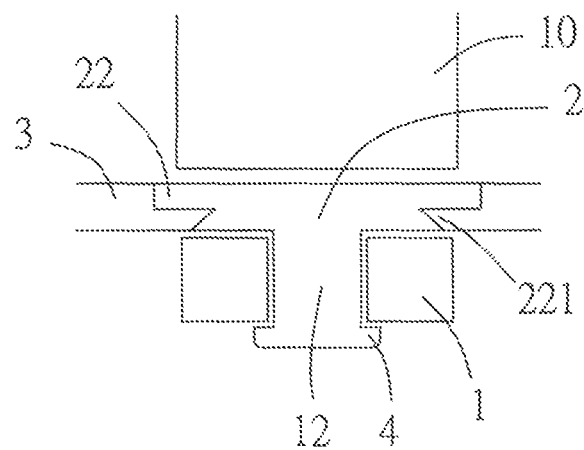
FIG. 19 is a schematic view 4 of the manufacturing method according to the preferred embodiment of the present invention.
Figure 20:
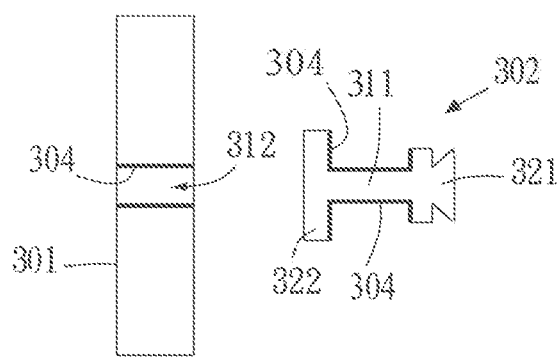
FIG. 20 is an exploded view of a roller structure according to an embodiment of the present disclosure.
Figure 21:
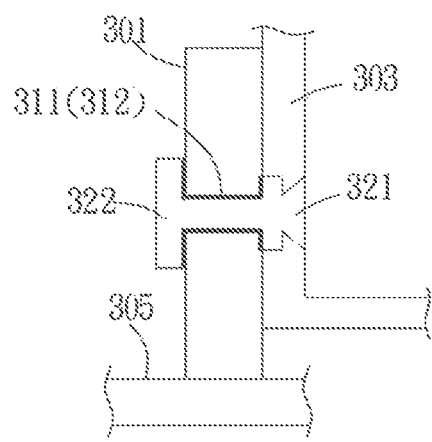
FIG. 21 is a schematic view of how the roller structure according to the embodiment of the present disclosure shown in FIG. 20 operates.
Figure 22:
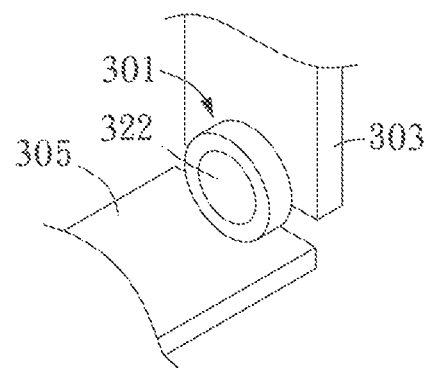
FIG. 22 is another schematic view of how the roller structure according to the embodiment of the present disclosure shown in FIG. 20 operates.

Referring to FIG. 14 and FIG. 16 to FIG. 19, the engaging portion 22 of the bush 2 is coupled to the load 3 (or the frame 6) via using a die 10 to press the second step portion 4 (shown in FIG. 16), the roller 1 (shown in FIG. 17), the engaging portion 22 of the bush 2 (shown in FIG. 19) or the first stop portion 21 of the bush 2 (shown in FIG. 18).

Referring to FIG. 20 through FIG. 23, the present disclosure provides a roller structure and a method of manufacturing the same. The roller structure comprises a roller 301 and a sleeve 302. The roller 301 has an axle portion 311 which the roller 301 rotates about. The roller 301 has an axial hole 312. The axle portion 311 is disposed in the axial hole 312 such that the roller 301 rotates about the axle portion 311. The sleeve 302 has one end disposed at one end of the axle portion 311. The other end of the sleeve 302 has a fitting portion 321. The fitting portion 321 is fitted to a carried object 303. The sleeve 302 has a first blocking portion 322 positioned proximate to one side of the roller 301 and disposed at the other end of the axle portion 311; hence, the roller 301 rotates between the first blocking portion 322 and the fitting portion 321. A substance 304 conducive to reduction of friction is coated or mounted on the axle portion 311, the axial hole 312 and the first blocking portion 322 to reduce friction between the roller 301 and the sleeve 302, so as to reduce the rolling friction of the roller 301 and allow the roller 301 to rotate easily, thereby enhancing ease of use.

In a preferred embodiment of the present disclosure, the friction between the roller 301 rolling and the sleeve 302 is less than the friction between a roller surface contact object 305 and the roller 301 rolling on the roller surface contact object 305 to allow the roller 301 to roll on the roller surface contact object 305 and about the axle portion 311 under an applied force. Hence, the roller structure of the present disclosure effectively reduces the rolling friction of the roller 301, and thus the roller 301 rotates easily, thereby enhancing ease of use.

In a preferred embodiment of the present disclosure, the substance 304 conducive to reduction of friction is liquid, solid, powder or aerosol. Hence, the nature of the substance 304 conducive to reduction of friction is chosen according to whether the substance 304 conducive to reduction of friction is coated or mounted, so as to facilitate the manufacturing of the substance 304 conducive to reduction of friction, thereby rendering the present disclosure practical.

Figure 23:
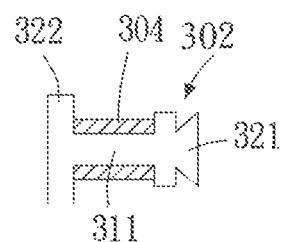
FIG. 23 is a schematic view of a substance conducive to reduction of friction according to another embodiment of the present disclosure.

In a preferred embodiment of the present disclosure, the substance 304 conducive to reduction of friction is Teflon, oil, plastic, lubricant, pad or washer. As shown in FIG. 23, the substance 4 conducive to reduction of friction is a washer made of a material according to whether it is coated or mounted, so as to facilitate the manufacturing of the substance 304 conducive to reduction of friction, thereby rendering the present disclosure practical.

In a preferred embodiment of the present disclosure, the friction between the roller 301 and the sleeve 302 is less than the friction between a roller surface contact object 305 and the roller 301 rolling on the roller surface contact object 305 while the roller 301 is rolling and bearing the weight of the carried object 303. Therefore, the roller structure of the present disclosure effectively reduces the rolling friction of the roller 301, and thus the roller 301 rotates easily, thereby enhancing ease of use.

In a preferred embodiment of the present disclosure, the substance 304 conducive to reduction of friction is coated or mounted on the axle portion 311, the axial hole 312 and the first blocking portion 322 by spraying, soaking, adhesion, engagement, electroplating, smearing, adsorption or fastening, depending on whether the substance 304 conducive to reduction of friction is coated or mounted, so as to facilitate the manufacturing of the substance 304 conducive to reduction of friction. Therefore, the present disclosure is practical.

Figure 24:
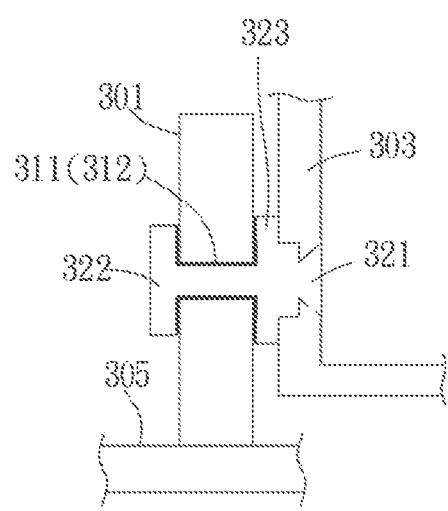
FIG. 24 is a cross-sectional view of the roller structure according to another embodiment of the present disclosure.

Referring to FIG. 24, in a preferred embodiment of the present disclosure, the roller structure further comprises a second blocking portion 323 disposed at the other end of the axle portion 311 and positioned proximate to the other side of the roller 301 such that the roller 1 rotates between the first blocking portion 322 and the second blocking portion 323. The substance 304 conducive to reduction of friction is coated or mounted on the second blocking portion 323 to reduce the friction between the roller 301 and the sleeve 302. Hence, the roller structure of the present disclosure effectively reduces the rolling friction of the roller 301 and thus the roller 301 rotates easily, thereby enhancing ease of use.

In a preferred embodiment of the present disclosure, the substance 304 conducive to reduction of friction is coated or mounted on the second blocking portion 323 by spraying, soaking, adhesion, engagement, electroplating, smearing, adsorption or fastening as need to facilitate the manufacturing of the substance 304 conducive to reduction of friction and thereby render the present disclosure practical.

The present disclosure further provides a method of manufacturing a roller structure, wherein the substance 304 conducive to reduction of friction is coated or mounted on the axle portion 311, the axial hole 312, the first blocking portion 322 and the second blocking portion 323 to reduce the friction between the roller 301 and the sleeve 302. Therefore, the method of manufacturing a roller structure according to the present disclosure effectively reduces the rolling friction of the roller 301, and thus the roller 301 rotates easily, thereby enhancing ease of use.

While the present disclosure has been described by means of specific embodiments, numerous modifications and variations could be made thereto by those skilled in the art without departing from the scope and spirit of the present disclosure set forth in the claims.

What is claimed is:

1. A roller assembly, the assembly comprising:
a roller having an axial hole;
an axle portion being disposed in the axial hole to allow the cylindrical portion to rotate about the axle portion; and
a sleeve with a first end disposed at a first end of the axle portion and a second end having a fitting portion, the fitting portion being configured to fit to a carried object having a weight, a second end of the axle portion having a first blocking portion positioned proximate to a first side of the roller and a whole width of the roller that is less than a distance between the first blocking portion and said first end of the sleeve to allow the roller to rotate between the first blocking portion and the fitting portion, wherein one of the axle portion, the axial hole and the first blocking portion has a substance conducive to reduction of friction between the roller and the sleeve.

2. The roller assembly of claim 1, further comprising a second blocking portion disposed at said second end of the axle portion and positioned proximate to a second side of the roller opposite said first side of the roller to allow the roller to rotate between the first blocking portion and the second blocking portion, the second blocking portion having a substance conducive to reduction of friction between the roller and the sleeve.

3. The roller assembly of claim 2, wherein the substance conducive to reduction of friction on the second blocking portion is coated or mounted on the second blocking portion by spraying, soaking, adhesion, engagement, electroplating, smearing, adsorption or fastening.

4. The roller assembly of claim 1, wherein the substance conducive to reduction of friction is liquid, solid, powder or aerosol.

5. The roller assembly structure of claim 1, wherein the substance conducive to reduction of friction is oil, plastic, lubricant, pad or washer.

6. The roller assembly of claim 1, wherein friction between the roller and the sleeve is less than friction between a roller surface contact object and the roller rolling on the roller surface contact object while the roller is rolling and bearing the weight of the carried object.

7. The roller assembly of claim 1, wherein the substance conducive to reduction of friction is coated or mounted on one of the axle portion, the axial hole and the first blocking portion by spraying, soaking, adhesion, engagement, electroplating, smearing, adsorption or fastening.

* * * * *